Nov. 29, 1949 R. A. ROSENBLUM 2,489,932
FLOW CONTROL DEVICE
Filed July 8, 1946
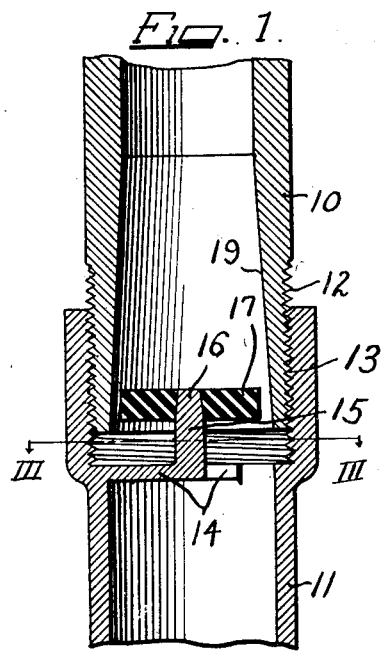
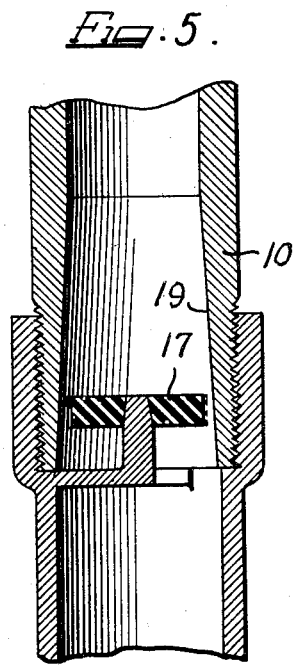
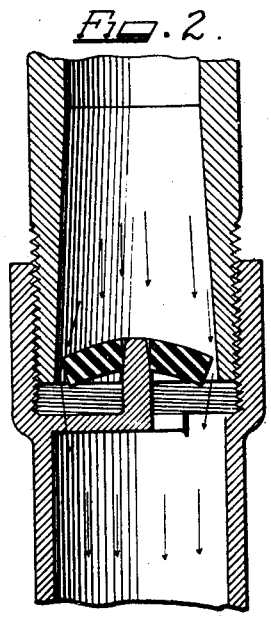
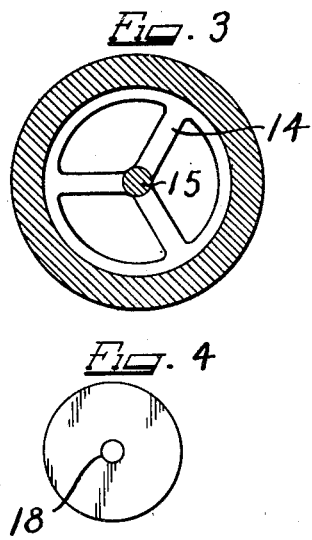
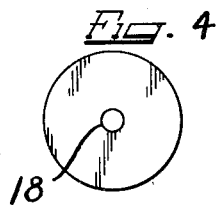
INVENTOR.
ROBERT A. ROSENBLUM
BY
ATTYS.

Patented Nov. 29, 1949

2,489,932

UNITED STATES PATENT OFFICE 2,489,932

FLOW CONTROL DEVICE

Robert A. Rosenblum, Chicago, Ill., assignor to The Dole Valve Company, Chicago, Ill., a corporation of Illinois Application July 8, 1946, Serial No. 682,016

9 Claims. (Cl. 138—43)

This invention relates to a flow control device and method, and more particularly, to a novel member for automatically maintaining a substantially uniform rate of flow of fluid, irrespective of wide variations of fluid pressure, and to a novel method for effecting such a result.

In the past, various means have been provided for maintaining a uniform rate of flow irrespective of variations in fluid presure. One such arrangement is disclosed in the Clyde A. Brown Patent No. 2,389,134, entitled "Flow control valve," granted November 20, 1945, in which the flow control member is a resilient washer having a central orifice which is seated on a shoulder, which shoulder terminates at a point spaced radially outwardly from the edge of the orifice. By controlling the dimension of the orifice with respect to the dimension of the shoulder and the relative stiffness of the washer, substantially uniform flow may be maintained irrespective of wide fluctuations in fluid pressure, due to the fact that upon increase of fluid pressure, the washer flexes and decreases the size of the central opening.

In this Brown construction, the central portion of the member is flexed by the fluid pressure, and as a result thereof, the size of the opening in the member itself is caused to vary.

One of the principal features and objects of the present invention is to provide a novel method and means for maintaining a substantially uniform rate of fluid flow irrespective of variations in fluid pressure in which fluid passes between the outer edge of a resilient disk-like member, and the wall of the housing or passageway, and in which the outer edge of the resilient member is flexed to vary the relative cross-sectional area of the passageway between the outer edge of the member and its housing or passageway.

A further object of the present invention is to provide a novel method and means for controlling the flow of fluid.

A still further object of the present invention is to provide a novel manner of supporting a flow control member.

Another and further object of the present invention is to provide a novel flow control means in which a manually adjustable means is provided for compensating for wear of the flow control member during its life.

The novel features which I believe to be characteristic of my invention are set forth with particularity in the appended claims. My invention, itself, however, both as to its manner of construction and method of manufacture, together with other objects and advantages thereof, may best be understood by reference to the following description, taken in conjunction with the accompanying drawing, in which:

Figure 1 is a sectional view through a tubular passageway having a flow control member therein embodying the novel teachings and principles of the present invention;

Figure 2 is a view similar to Figure 1 but showing the manner in which the flow member is flexed due to fluid pressure;

Figure 3 is a transverse sectional view through the structure as taken along the line III—III of Figure 1;

Figure 4 is a plan view of the flow member; and

Figure 5 is a view similar to Figure 1, but showing the two cooperating housing members adjusted to compensate for wear in the flow member thereby to maintain a uniform flow characteristic even though the flow member is slightly worn.

As illustrated in Figure 1 of the drawing, two cooperating housing members 10 and 11 are provided, the member 10 being externally threaded as at 12, and the member 11 being provided with an internally threaded socket 13 which mates with the threaded end portion 12.

The housing member 11 is provided at the lower end of the socket 13 with a spider 14 having an upstanding center post 15 extending in the opposite direction to the direction of fluid flow. The center post 15 is slightly tapered as at 16 at its upper end to receive and have supported thereon a resilient flow member 17.

The flow member 17 is preferably made of rubber or some synthetic material such as neoprene and is provided with a central opening 18 which is tapered to mate with the tapered upper end 16 of the post 15. The flow member 17 terminates short of the inner tapered wall 19 of the housing member 10, so that there is an annular space between the outer peripheral edge of the disk-like member 17 and the inner surface of the housing member 10.

When fluid under pressure is admitted to the passageway in the upper housing member 10, it flows down past the outer peripheral edge of the flow member 17 and into the passageway of the lower housing member 11. Due to the fact that the flow member 17 is supported only at its center, the outer peripheral portion of the flow member 17 will be flexed downwardly as is clearly shown in Figure 2 of the drawing.

It will be observed that as the outer edge of the flow member 17 is flexed downwardly, the upper outer edge of the flow member moves closer to the inner wall of the passageway, thereby decreasing the flow past this point. The greater the pressure drop between the inlet and outlet side of the housings 10 and 11, respectively, the nearer will be the outer upper edge of the flow member 17.

Thus, it will be seen that as the pressure increases (thus increasing the velocity of the fluid), the more restricted will be the passageway past the flow member 17.

With the construction as illustrated in the drawing and as described above, it has been found that very accurate control of fluid flow may be maintained over a wide variation in fluid pressures.

Provision is made in the present invention for compensating for wear at the outer edge of the flow member 17 so that it may have a longer useful life. This is provided by making the inner wall 19 of the housing member 10 slightly tapered. As the outer edge of the flow washer 17 wears, the upper housing member 10 may be screwed further down into the socket 13, thus moving the inner surface of the passageway in the housing member 10 closer to the center.

This is illustrated in Figure 5 where the upper housing member 10 is shown as being screwed all the way down into the socket 13. The dotted line in Figure 5 shows the original diameter of the flow member 17, while the full line shows it slightly worn. It will be observed that in this position, the cross-sectional area of the annular passageway between the flow member 17 and the inner surface of the housing 10 lying immediately opposite is the same as before the flow member 17 was worn. This enables the useful life of the flow member 17 to be extended.

While I have shown a particular embodiment of my invention including a novel method of controlling fluid flow as well as a novel flow control member, it will, of course, be understood that I do not wish to be limited thereto, since many modifications may be made, and I, therefore, contemplate by the appended claims to cover all such modifications as fall within the true spirit and scope of my invention.

I claim as my invention:

1. A flow control device comprising a housing having a passageway extending therethrough, an elastic member, means for supporting said member near its center, the outer peripheral surface of said member being spaced inwardly from the inner walls of said passageway, whereby upon flow of fluid through said passageway said member is flexed to decrease the size of the spacing between said member and said passageway.

2. A flow control device comprising a housing having a tubular passageway extending therethrough, an elastic wafer disposed transversely across said passageway and of smaller diameter than the diameter of the adjacent portion of said passageway, and means for supporting said wafer in proximity to its center to provide for flexing of the outer portion of said wafer in a downstream direction upon flow of fluid around the outer edge of said wafer, and whereby the area between said wafer and the tubular wall of said passageway is decreased.

3. A flow control device comprising a housing having a tubular passageway extending therethrough, an elastic wafer disposed transversely across said passageway and of smaller diameter than the diameter of the adjacent portion of said passageway, and a center post mounted in said passageway, said wafer being supported on said center post to provide for flexing of the outer portion of said wafer in a downstream direction upon flow of fluid around the outer edge of said wafer, and whereby the area between the outer edge of said wafer and the tubular wall of said passageway is decreased.

4. A flow control device comprising a housing having a tubular passageway extending therethrough, an elastic disk disposed transversely across said passageway and of smaller diameter than the diameter of the adjacent portion of said passageway, and a center post mounted in said passageway, said disk being supported solely on said center post to provide for flexing of the outer portion of said disk in a downstream direction upon flow of fluid around the outer edge of said disk, and means for decreasing the spacing between the outer edge of said disk and the wall of the adjacent portion of said passageway.

5. A flow control device comprising a pair of housing members having a passageway extending therethrough, one of said housing members being adjustable longitudinally with respect to the other housing member, the passageway in at least one of said housing members being slightly tapered, an elastic disk disposed transversely across said passageway and of smaller diameter than the diameter of the adjacent portion of said passageway, said adjacent portion of said passageway being a part of the tapered passageway of one of said housing members, and a center post mounted in said passageway on the other of said housing members, said disk being supported solely by said center post to provide for flexing of the outer portion of said disk in a downstream direction upon flow of fluid around the outer edge of said disk.

6. A flow control device comprising a housing having a tubular passageway extending therethrough, a resilient disk disposed transversely across said passageway and of smaller diameter than the diameter of the adjacent portion of said passageway, a spider extending across said passageway on the downstream side of said disk, a center post mounted on said spider and projecting toward the upstream end of said passageway, said disk being supported on said center post to provide for flexing of the outer portion of said disk in a downstream direction upon flow of fluid around the outer edge of said disk.

7. A flow control device comprising a housing having a tubular passageway extending therethrough, a resilient disk disposed transversely across said passageway and of smaller diameter than the diameter of the adjacent portion of said passageway, a spider extending across said passageway on the downstream side of said disk, a center post mounted on said spider and projecting toward the upstream end of said passageway, said center post having a tapered upper end, said disk having a central opening therethrough, said disk being seated on said center post with the tapered portion thereof projecting through the central opening in said disk to provide a firm seat for said disk, thereby to provide for flexing of the outer portion of said disk in a downstream direction upon flow of fluid around the outer edge of said disk.

8. In a fluid flow control device, means defining a tapered flow passage, an elastic member adjustably positioned in said tapered flow passage and coacting therewith around its periphery to define an annular orifice, and adjustable means for shifting said elastic member along said tapered passage to vary the size of the annular orifice.

9. In a fluid flow control device, a casing having a tapered passageway, an elastic disk in said casing spaced inwardly from the wall of said tapered passage and coacting therewith to define an annular orifice, a support for said disk inwardly from the periphery of the disk to permit flexing of the peripheral margin of the disk under the influence of a fluid pressure to vary the annular orifice size, and adjustable means for shifting said support along said tapered passage to adjust the disk longitudinally of the tapered passage for setting the initial orifice size.

ROBERT A. ROSENBLUM.

REFERENCES CITED

The following references are of record in the file of this patent:

UNITED STATES PATENTS

| Number | Name | Date |
|---|---|---|
| 1,152,127 | Stackpole | Aug. 31, 1915 |
| 2,389,134 | Brown | Aug. 20, 1945 |

FOREIGN PATENTS

| Number | Country | Date |
|---|---|---|
| 75,809 | Germany | of 1893 |